United States Patent
Shariff et al.

(10) Patent No.: US 12,019,533 B2
(45) Date of Patent: Jun. 25, 2024

(54) METHODS AND ELECTRONIC DEVICES FOR BEHAVIOR DETECTION USING FEDERATED LEARNING PRELIMINARY CLASS

(71) Applicant: SAMSUNG ELECTRONICS CO., LTD., Suwon-si (KR)

(72) Inventors: Mohamed Akram Ulla Shariff, Karnataka (IN); Parameswaranath Vadackupurath Mani, Karnataka (IN); Barath Raj Kandur Raja, Karnataka (IN); Mrinaal Dogra, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/191,403

(22) Filed: Mar. 28, 2023

(65) Prior Publication Data

US 2023/0251950 A1    Aug. 10, 2023

Related U.S. Application Data

(63) Continuation of application No. PCT/KR2022/013900, filed on Sep. 16, 2022.

(30) Foreign Application Priority Data

Sep. 17, 2021  (IN) .............................. 202141042231
Aug. 30, 2022  (IN) .............................. 202141042231

(51) Int. Cl.
G06F 11/34    (2006.01)
(52) U.S. Cl.
CPC ............................... *G06F 11/3438* (2013.01)

(58) Field of Classification Search
CPC ...... G06F 11/3438; G06F 18/25; G06F 16/35; G06F 17/26; G06F 10/26
See application file for complete search history.

(56) References Cited

U.S. PATENT DOCUMENTS 10,477,342 B2     11/2019   Williams
11,093,834 B2 *    8/2021   Ahern ...................... H04W 4/80
(Continued)

FOREIGN PATENT DOCUMENTS

JP       6178800 B2      7/2017
WO    2020191282 A2      9/2020

OTHER PUBLICATIONS

International Search Report for PCT/KR2022/013900 mailed Dec. 27, 2022, 3 pages.
(Continued)

*Primary Examiner* — Michael A Keller
*Assistant Examiner* — Thao D Duong
(74) *Attorney, Agent, or Firm* — Nixon & Vanderhye P.C.

(57) ABSTRACT

Embodiments herein disclose methods and systems for identifying behavioural trends across users. The system includes electronic devices. The electronic devices include a behavioural recommendation controller. The behavioural recommendation controller is configured to: detect a first plurality of activities performed by a plurality of first users in relation with a plurality of contexts; recognize the first plurality of physical activities in relation with the plurality of contexts for the first user; recognize multiple activities performed using smart devices by the first user during each first physical activity in each context; and recognize a second plurality of physical activities performed by multiple concurrent second users during each context to refer current behavior or new behavior of the users.

15 Claims, 21 Drawing Sheets

(56) References Cited

U.S. PATENT DOCUMENTS

| | | | |
|---|---|---|---|
| 11,482,127 B2 | 10/2022 | Faldu et al. | |
| 11,483,174 B1* | 10/2022 | Eberhardt | H04L 12/2829 |
| 11,723,560 B2 | 8/2023 | Constantin et al. | |
| 2002/0076025 A1* | 6/2002 | Liversidge | H04L 51/04 |
| | | | 709/204 |
| 2013/0196649 A1 | 8/2013 | Paddon et al. | |
| 2014/0237123 A1* | 8/2014 | Dave | H04M 19/04 |
| | | | 709/227 |
| 2014/0350349 A1 | 11/2014 | Geurts et al. | |
| 2015/0067845 A1 | 3/2015 | Chari et al. | |
| 2015/0161570 A1* | 6/2015 | Burgmeier | G06Q 10/1095 |
| | | | 705/7.19 |
| 2017/0255868 A1 | 9/2017 | Gelinas et al. | |
| 2017/0310775 A1 | 10/2017 | Tatourian et al. | |
| 2018/0332131 A1* | 11/2018 | Papakipos | G01S 19/01 |
| 2019/0296969 A1* | 9/2019 | Zimny | H04W 12/03 |
| 2019/0312886 A1 | 10/2019 | Ford et al. | |
| 2019/0385211 A1* | 12/2019 | DeLuca | G06Q 30/0631 |
| 2019/0392395 A1* | 12/2019 | Valliani | G06Q 10/109 |
| 2020/0065682 A1 | 2/2020 | Paulina et al. | |
| 2021/0390144 A1* | 12/2021 | B M S | H04L 65/1093 |
| 2022/0053073 A1* | 2/2022 | Appel | H04N 21/4122 |
| 2022/0086181 A1* | 3/2022 | Richman | H04L 63/0892 |
| 2023/0114650 A1* | 4/2023 | Keith, Jr. | G06F 21/316 |
| | | | 726/7 |

OTHER PUBLICATIONS

Written Opinion of the ISA for PCT/KR2022/013900 mailed Dec. 27, 2022, 5 pages.
[Online], Behavior Identification of Social Individuals from Sensor Data, Aug. 6, 2019, one (1) page.
Obinikpo et al., "Big Sensed Data Meets Deep Learning for Smarter Health Care in Smart Cities", Journal of Sensor and Actuator Networks, published Nov. 20, 2017, 22 pages.
[Online], Yu et al., "Sensor-Based Behavior Recognition", Mar. 2020, 3 pages.
[Online], Chua et al., Towards Behaviour Recognition with Unlabelled Sensor Data: As Much as Necessary, as Little as Possible, 2013, 5 pages.
Wearable Analytics, Real-time Big Data Analysis of Wearable Devices, May 3, 2018, 15 pages.
Indian Examination Report dated Nov. 2, 2023 for IN Application No. 202141042231.

* cited by examiner

FIG. 6

| | Context 1 | | | | | | | | | Context 2 | ... | Context n |
|---|---|---|---|---|---|---|---|---|---|---|---|---|
| Activities | Walking | Standing | Sitting | Sleeping | ... | Watching | Browsing | Gaming | Shopping | ... | ... | |
| Walking | Activities | Walking | Standing | Sitting | Sleeping | ... | Watching | Browsing | Gaming | Shopping | ... | |
| Standing | Walking | 1.0 | 0 | 0 | 0 | . | 0.6 | 0.0 | 0.1 | 0.0 | ... | - |
| Sitting | Standing | 0.0 | 1.0 | 0.0 | 0.0 | . | 0.2 | 0.4 | 0.1 | 0.3 | ... | - |
| Sleeping | Sitting | 0.0 | 0.0 | 1.0 | 0.0 | . | 0.1 | 0.5 | 0.4 | 0.0 | ... | - |
| ... | Sleeping | 0.0 | 0.0 | 0.0 | 1.0 | . | 0.0 | 0.0 | 0.2 | 0.1 | ... | - |
| Watching | ... | - | - | - | - | . | - | - | - | - | ... | - |
| Browsing | Watching | 0.6 | 0.2 | 0.1 | 0.0 | . | 1.0 | 0.1 | 0.1 | 0.1 | ... | - |
| Gaming | Browsing | 0.0 | 0.4 | 0.5 | 0.2 | . | 0.1 | 1.0 | 0.1 | 0.2 | ... | - |
| Shopping | Gaming | 0.1 | 0.1 | 0.4 | 0.2 | . | 0.1 | 0.1 | 1.0 | 0.1 | ... | - |
| ... | Shopping | 0.0 | 0.3 | 0.0 | 0.1 | . | 0.1 | 0.2 | 0.1 | 1.0 | ... | - |
| | ... | - | - | - | - | . | - | - | - | - | ... | - |

FIG. 7

| Activities | Walking | Standing | Sitting | Sleeping | ... | Watching | Browsing | Gaming | Shopping | ... |
|---|---|---|---|---|---|---|---|---|---|---|
| Walking | 1.0 | 0 | 0 | 0 | . | 0.6 | 0.0 | 0.1 | 0.0 | - |
| Standing | 0.0 | 1.0 | 0.0 | 0.0 | . | 0.2 | 0.4 | 0.1 | 0.3 | - |
| Sitting | 0.0 | 0.0 | 1.0 | 0.0 | . | 0.1 | 0.5 | 0.4 | 0 | - |
| Sleeping | 0.0 | 0.0 | 0.0 | 1.0 | . | 0.0 | 0.2 | 0.2 | 0.1 | - |
| ... | - | - | - | - | . | - | - | - | - | - |
| Watching | 0.6 | 0.2 | 0.1 | 0.0 | . | 1.0 | 0.1 | 0.1 | 0.1 | - |
| Browsing | 0.0 | 0.4 | 0.5 | 0.2 | . | 0.1 | 1.0 | 0.1 | 0.2 | - |
| Gaming | 0.1 | 0.1 | 0.4 | 0.2 | . | 0.1 | 0.1 | 1.0 | 0.1 | - |
| Shopping | 0.0 | 0.3 | 0.0 | 0.1 | . | 0.1 | 0.2 | 0.1 | 1.0 | - |
| ... | - | - | - | - | . | - | - | - | - | - |

| 0.1 | 0.5 | 0.0 | 0.1 | 0.0 | 0.1 | 0.2 |
| --- | --- | --- | --- | --- | --- | --- |
| 0.0 | 0.0 | 0.2 | 0.1 | 0.5 | 0.1 | 0.1 |

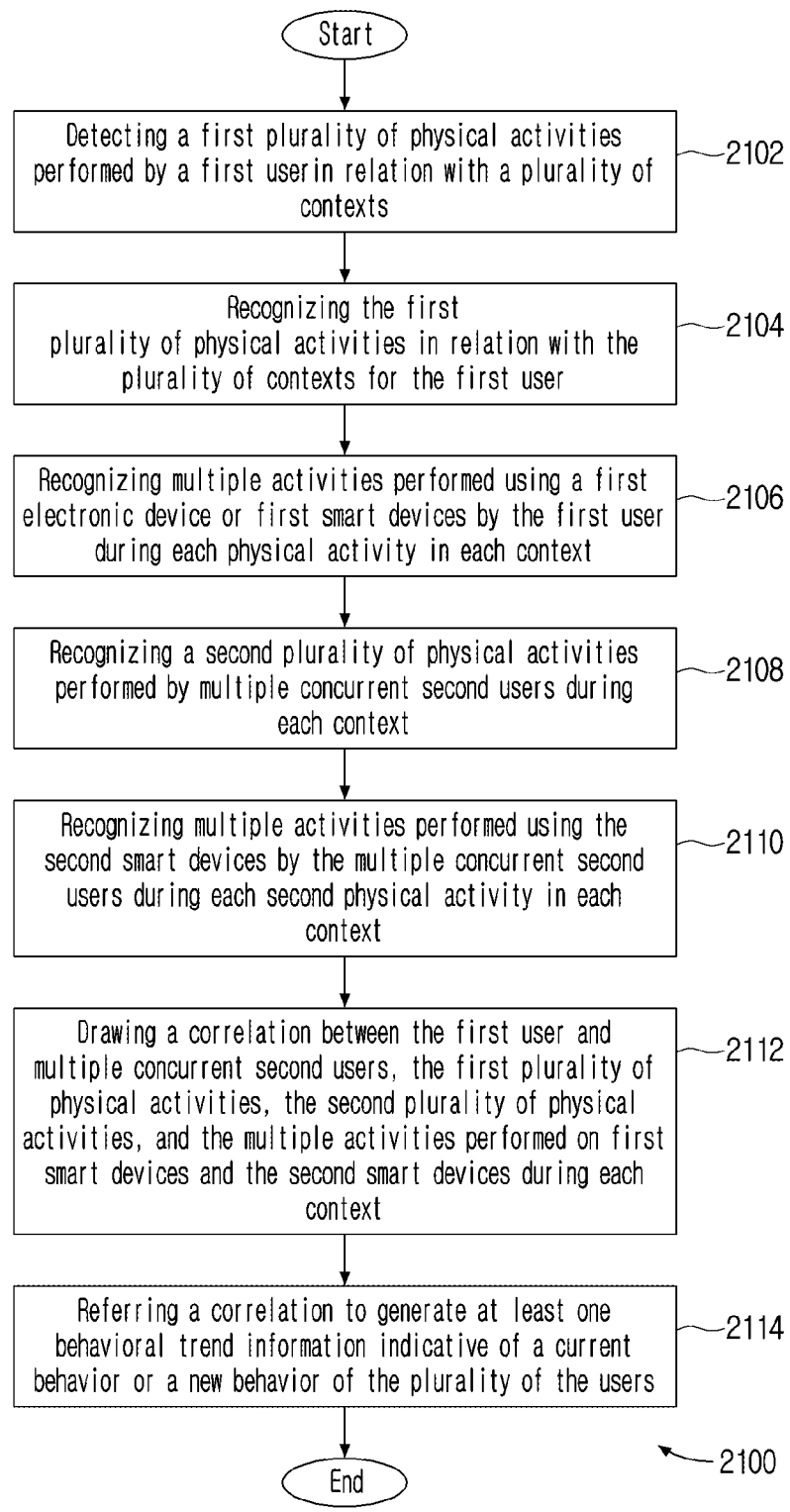

METHODS AND ELECTRONIC DEVICES FOR BEHAVIOR DETECTION USING FEDERATED LEARNING PRELIMINARY CLASS

CROSS-REFERENCE TO RELATED APPLICATIONS

This application is a continuation of International Application No. PCT/KR2022/013900 designating the United States, filed on Sep. 16, 2022, in the Korean Intellectual Property Receiving Office and claiming priority to Indian Provisional Patent Application No. 202141042231, filed on Sep. 17, 2021, and to Indian Complete Patent Application No. 202141042231, filed on Aug. 30, 2022, the disclosures of all of which are incorporated by reference herein in their entireties.

BACKGROUND

Field

The disclosure relates to managing behavioral context of users and for example, to detecting the behaviour of the users using a Federated Learning (FL) approach.

Description of Related Art

Existing electronic devices are limited to detecting pre-identified behaviors such as basic activities of users, such as, but not limited to, cycling, walking, driving, and the like. The basic activities of the users are detected using heuristics or pre-trained models. To train the pre-trained models, the electronic device requires data from a server. The data is directly stored in the server from the user's electronic device, which can lead to a violation of the privacy of the user. The pre-trained model or heuristics are also ineffective in capturing most or dynamic human behaviors. Also, no current solutions decentralize behaviour curation using an emotion correlation.

SUMMARY

Embodiments of the disclosure provide methods and electronic devices for detecting behaviour of users using a Federated Learning (FL) approach.

Embodiments of the disclosure provide methods and electronic devices for detecting user behavior using smart device usage data to alter the smart device behavior and nudge the user, based on the behavior applicability for each application.

Accordingly, various example embodiments herein provide a method to identify behavioral trends across users. The method includes: detecting, by a first electronic device, a first plurality of physical activities performed by a first user in relation with a plurality of contexts; recognizing, by the first electronic device, the first plurality of physical activities in relation with the plurality of contexts for the first; recognizing, by the first electronic device or first smart devices, multiple activities performed using electronic devices by the first user during each first physical activity in each context; recognizing, by a second electronic device, a second plurality of physical activities performed by multiple concurrent second users during each context; recognizing, by the second electronic device or a second smart devices, multiple activities performed using the second smart devices by the multiple concurrent second users during each second physical activity in each context; drawing, by a server, a correlation between the first user and multiple concurrent second users, the first plurality of physical activities, the second plurality of physical activities, and the multiple activities performed on first smart devices and second smart devices during each context; and referring, by the server, a correlation to generate at least one behavioral trend information indicative of a current behaviour or a new behavior of the plurality of the users.

Various example embodiments disclose that the plurality of contexts includes at least one of time, place, occasion, and environment.

Various example embodiments disclose that the activities of the plurality of users are correlated using a joint probability distribution (JPD) tables for each context.

Various example embodiments disclose that the method further includes: predicting, by the electronic device, a next behavior of the user using a Machine Learning (ML) model based on at least one of current behavior, the context and current activities of the user.

Various example embodiments disclose that the method further includes: curating, by the electronic device, the new behavior as a sought behaviour and an unsought behavior, wherein the at least one provided behavioural recommendation can reinforce the sought behaviors and fade the unsought behaviors.

Various example embodiments disclose that the method further includes: sending, by the user devices, the JPD tables to a server for aggregation of the JPD tables of different users.

Various example embodiments disclose that the method further includes: capturing, by the electronic device, emotion information of the users to curate the one or more identified behaviors as sought and unsought behaviors.

Various example embodiments disclose that the method further includes: providing, by the electronic device, recommendations to reinforce the sought behaviors.

Various example embodiments disclose that the method further includes: providing, by the electronic device, recommendations to fade the unsought behaviors.

Various example embodiments disclose that the method further includes: identifying, by the server, outlier and anomalous behaviors which have probabilities different from global averages.

Various example embodiments disclose that the electronic device is trained in a distributed manner to recognize the activities.

Various example embodiments disclose the JPD tables are shared with the server while maintaining privacy of the JPD tables.

Various example embodiments disclose that the method further includes: curating, by a human curator, to define sought or unsought behaviors and to define actions or recommendations or nudges for each behaviour of the users.

Various example embodiments disclose that the method further includes: identifying by the server, an outlier and anomalous user behaviors which have probabilities of different behaviors from global behavioural averages.

Various example embodiments disclose that the method further includes: altering, by the electronic device, a parental control device based on alerted behaviour of a child while using the electronic device.

Various example embodiments provide a system for identifying behavioral trends across users. The system includes: a server, plurality of electronic devices, and a plurality of smart devices. The plurality of electronic devices includes: a memory, at least one processor, a behavioral recommendation controller connected to the memory and the at least one processor and configured to: detect a first plurality of physical activities performed by a first user in relation with a plurality of contexts; recognize the first plurality of physical activities in relation with the plurality of contexts for the first user; recognize multiple activities performed using the first smart devices by the first user during each first physical activity in each context; recognize a second plurality of physical activities performed by multiple concurrent second users during each context; recognize multiple activities performed using the second smart devices by the multiple concurrent second users during each second physical activity in each context; draw a correlation between the first user and multiple concurrent second users, the first plurality of physical activities, the second plurality of physical activities, and the multiple activities performed on first smart devices and second smart devices during each context; and refer a correlation to generate at least one behavioral trend information indicative of a current behaviour or a new behaviour of the plurality of the users.

Various example embodiments disclose that the activities of the plurality of users are correlated using a joint probability distribution (JPD) tables for each context.

Various example embodiments disclose that the behavioural recommendation controller is further configured to: predict a next behavior of the user using a Machine Learning (ML) model based on at least one of current behavior, the context and current activities of the user.

Various example embodiments disclose that the behavioural recommendation controller is further configured to: curate the new behavior as a sought behaviour and an unsought behavior, wherein the at least one provided behavioural recommendation can reinforce the sought behaviors and fade the unsought behaviors.

Various example embodiments disclose that the behavioural recommendation controller is further configured to: send the JPD tables to a server for aggregation of the JPD tables of different users.

These and other aspects and features of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example of joint probability distribution (JPD) tables for each context, according to various embodiments;

FIG. 7 is a diagram illustrating an example of a correlation of emotion with behavior, according to various embodiments;

FIG. 21 is a flowchart illustrating an example method to identify behavioral trends across users, according to various embodiments.

DETAILED DESCRIPTION

Figure 1:
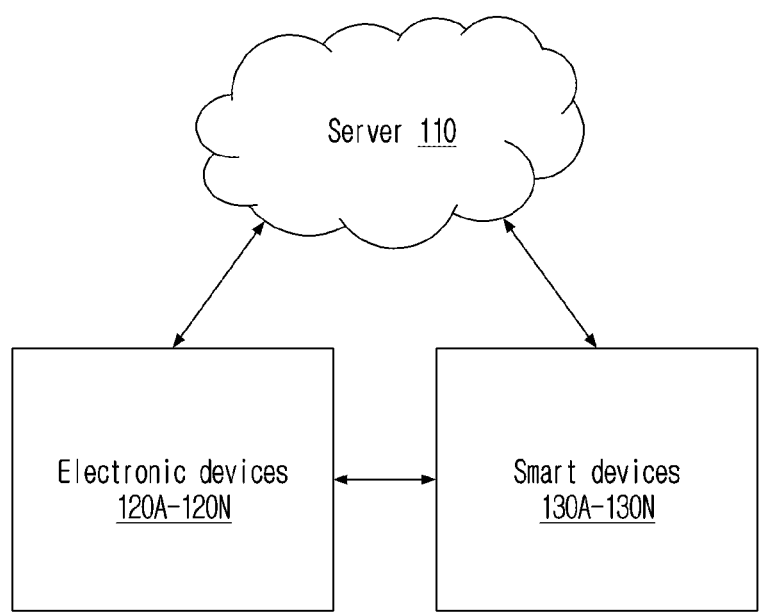
FIG. 1 is a diagram illustrating an example system for identifying behavioral trends across users, according to various embodiments.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The examples used herein are intended merely to facilitate an understanding of ways in which the disclosure can be practiced and to further enable those of skill in the art to practice the embodiments herein. Accordingly, the examples should not be construed as limiting the scope of the disclosure herein.

The embodiments herein achieve methods and electronic devices for detecting the behaviour of users using a federated learning approach. Referring now to the drawings, and more particularly to FIGS. 1 through 21, where similar reference characters denote corresponding features throughout the figures, there are shown at least various example embodiments.

FIG. 1 is a diagram illustrating an example system 100 for identifying behavioral trends across users, according to various embodiments. The system 100 includes a server (110), a plurality of electronic devices (120A-120N), and a plurality of smart devices (130A-130N).

Figure 2:
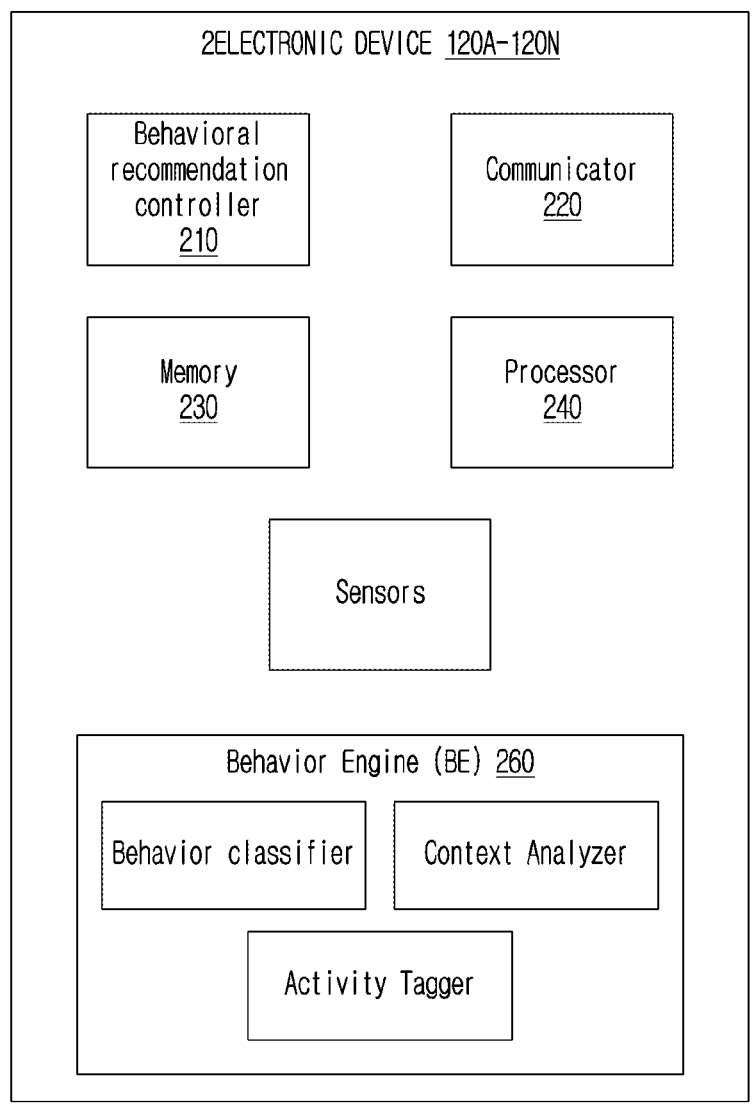
FIG. 2 is a block diagram illustrating an example configuration of an electronic device to identify behavioral trends across users, according to various embodiments.

FIG. 2 is a block diagram illustrating an example configuration of electronic devices (120A-120N) to identify behavioral trends across users, according to various embodiments. The electronic devices (120A-120N) include a behavioral recommendation controller (e.g., including various processing and/or control circuitry) 210, a communicator (e.g., including communication circuitry) 220, a memory 230, and at least one processor (e.g., including processing circuitry) 240. The behavioral recommendation controller 210 can be connected to the memory and the at least one processor 240.

The behavioral recommendation controller 210 may include various processing and/or control circuitry and can be configured to detect an activity performed by a plurality of users in relation with a plurality of contexts. Examples of the plurality of contexts includes at least one of time, place, occasion, and environment. The behavioral recommendation controller 210 may be further configured to recognize a first plurality of physical activities in relation with the plurality of contexts for a first user. The behavioral recommendation controller 210 may be further configured to recognize multiple activities performed using smart devices by the first user during each physical activity in each context. The behavioral recommendation controller 210 may be further configured to recognize a second plurality of physical activities performed by multiple concurrent second users during each context. The behavioural recommendation controller 210 may be further configured to recognize multiple activities performed using the second smart devices 130B by the multiple concurrent second users during each second physical activity in each context. The behavioral recommendation controller 210 may be further configured to draw a correlation between the first user and multiple concurrent second users, the first plurality of physical activities, the second plurality of physical activities, and the multiple activities performed on first smart devices 130A and second smart devices 130B during each context. The behavioural recommendation controller 210 may be further configured to refer a correlation to generate at least one behavioural trend information indicative of a current behaviour or a new behaviour of the plurality of the users.

Example embodiments herein disclose that the activities of the plurality of users may be correlated using a joint probability distribution (JPD) tables for each context. The behavioral recommendation controller 210 may be further configured to predict a next behavior of the user using a Machine Learning (ML) model based on at least one of current behavior, the context and current activities of the user. The behavioral recommendation controller 210 may be further configured to curate the new behavior as a sought behaviour and an unsought behavior. The at least one provided behavioural recommendation can reinforce the sought behaviors and fade the unsought behaviors. The behavioral recommendation controller 210 may be further configured to send the JPD tables to a server from the user device to aggregation of the JPD tables of different users.

The behavioral recommendation controller 210 may be further configured to capture emotion information of the users to curate the one or more identified behaviors as sought and unsought behaviors. The behavioral recommendation controller 210 may be further configured to provide recommendations to reinforce the sought behaviors. The behavioral recommendation controller 210 may be further configured to provide recommendations to fade the unsought behaviors. The behavioral recommendation controller 210 may be further configured to identify outlier and anomalous behaviors which have probabilities different from global averages. The electronic devices (120A-120N) may be trained in a distributed manner to recognize the activities. The JPD tables may be shared with the server while maintaining privacy of the JPD tables.

The behavioral recommendation controller 210 may be further configured to curate using a human curator to define sought or unsought behaviors and to define actions or recommendations or nudges for each behaviour of the users. The behavioral recommendation controller 210 may be further configured to identify an outlier and anomalous user behaviors which have probabilities of different behaviors from global behavioural averages. The behavioral recommendation controller 210 may be further configured to alert an electronic device belonging to a parent, about a child's behavior based on the behaviour of the child on the electronic device 120*a* belonging to the child.

Further, the processor 240 may include various processing circuitry and is configured to execute instructions stored in the memory 230 and to perform various processes. The communicator 220 may include various communication circuitry and is configured for communicating internally between internal hardware components and with external devices via one or more networks. The memory 230 also stores instructions to be executed by the processor 240. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be understood as being non-movable. In certain examples, a non-transitory storage medium may store data that can, over time, change (e.g., in Random Access Memory (RAM) or cache).

At least one of the plurality of modules may be implemented through an artificial intelligence (AI) model. A function associated with the AI model may be performed through the non-volatile memory, the volatile memory, and the processor 140. The processor 240 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors may control the processing of the input data in accordance with a predefined operating rule or the AI model stored in the non-volatile memory and the volatile memory. The predefined operating rule or artificial intelligence model can be provided through training or learning.

Here, being provided through learning may refer, for example, to a predefined (e.g., specified) operating rule or AI model of a desired characteristic is made by applying a learning algorithm to a plurality of learning data. The learning may be performed in a device itself in which AI according to an embodiment is performed, and/o may be implemented through a separate server/system.

The AI model may include of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may refer, for example, to a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 shows various hardware components of the electronic devices (120A-120N) it is to be understood that other embodiments are not limited thereon. In various embodiments, the electronic devices (120A-120N) may include less or a greater number of components. Further, the labels or names of the components are used only for illustrative purpose and does not limit the scope of the disclosure. One or more components can be combined together to perform same or substantially similar function in the electronic devices (120A-120N).

Figure 3:
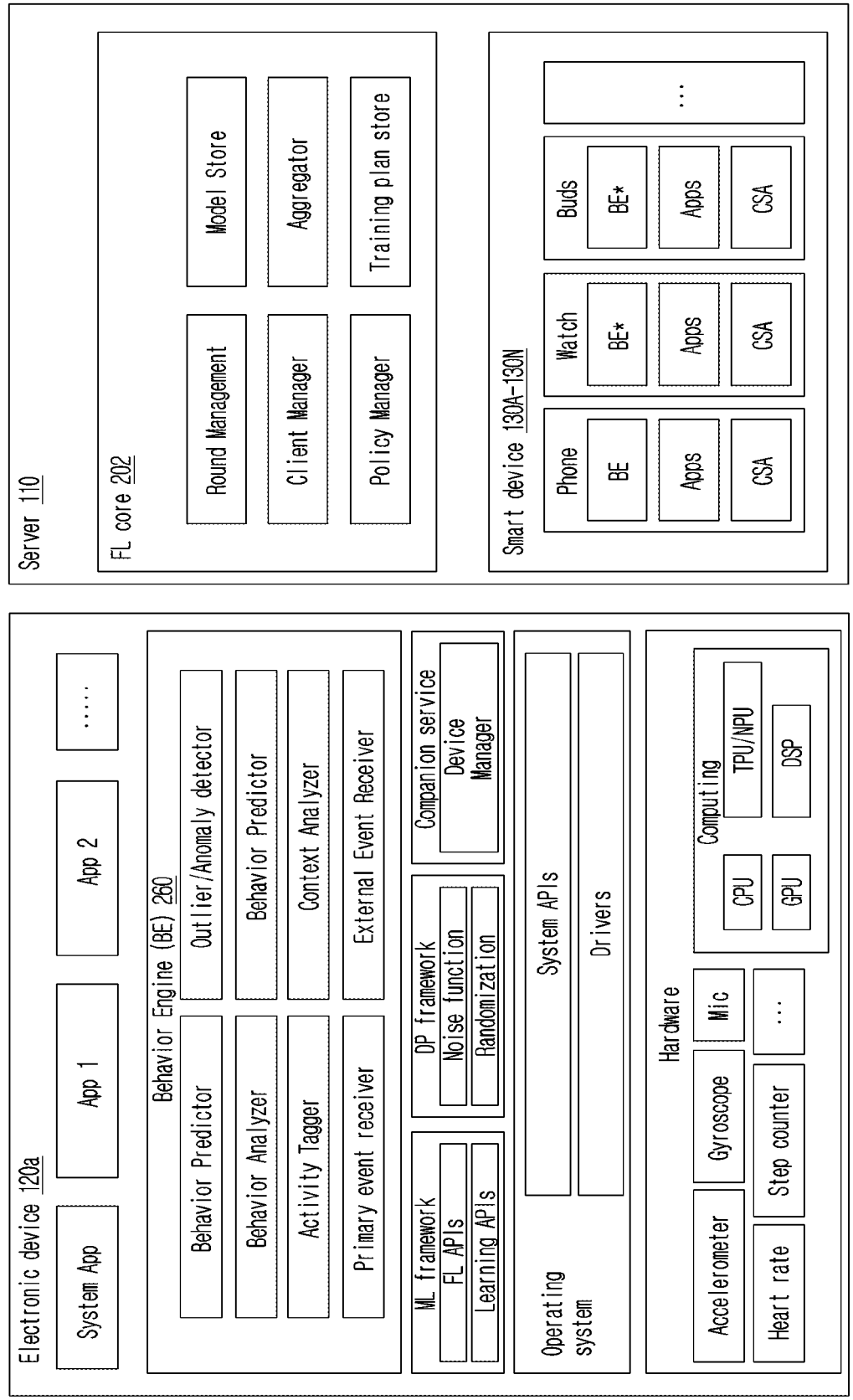
FIG. 3 is a diagram illustrating an interaction between the electronic device and a server to identify behavioral trends across the users, according to various embodiments.

FIG. 3 is a diagram illustrating an example interaction between the electronic device and a server to identify behavioral trends across the users, according to various embodiments. Data used in the electronic devices (120A-120N) and smart devices (130A-130N) is monitored to alter the user behavior (if required) and nudge (e.g., urge) the user, based on the behavior applicability for each application. A behaviour engine 260 of the electronic devices (120A-120N) can receive usage data of the electronic devices (120A-120N) and the smart devices (130A-130N). A behaviour engine 260 can detect the behaviour of the user using an activity monitor, an activity analyser, a context manager, and a persona manager. The behaviour engine 260 can provide the detected behaviour to one or more applications present on the electronic devices (120A-120N). A behavior classification can be generated by monitoring and analysing the electronic devices (120A-120N) usage activities. The server 110 can use the usage data of the electronic devices (120A-120N) to analyse the activity of the user and monitor the activity of the user. The server can use the analysed activity and the monitored activity to classify the behaviour of the user, and to determine a next behaviour of the user. The generated behavior can be used by applications such as a System User Interface (UI) (notification panel), Operating System Module/Feature/Service/Application, health applications, and the like, to adapt themselves according to the detected behavior. Examples of the smart devices (130A-130N) can be, but not limited to, wearable device, smart phones, phones, headphones, and so on.

Embodiments herein disclose that the server 110 includes an FL core 202, including a round manager, model store, client manager, aggregator, policy manager, training plan store and modules can be extended to facilitate distribute learning.

Figure 4:
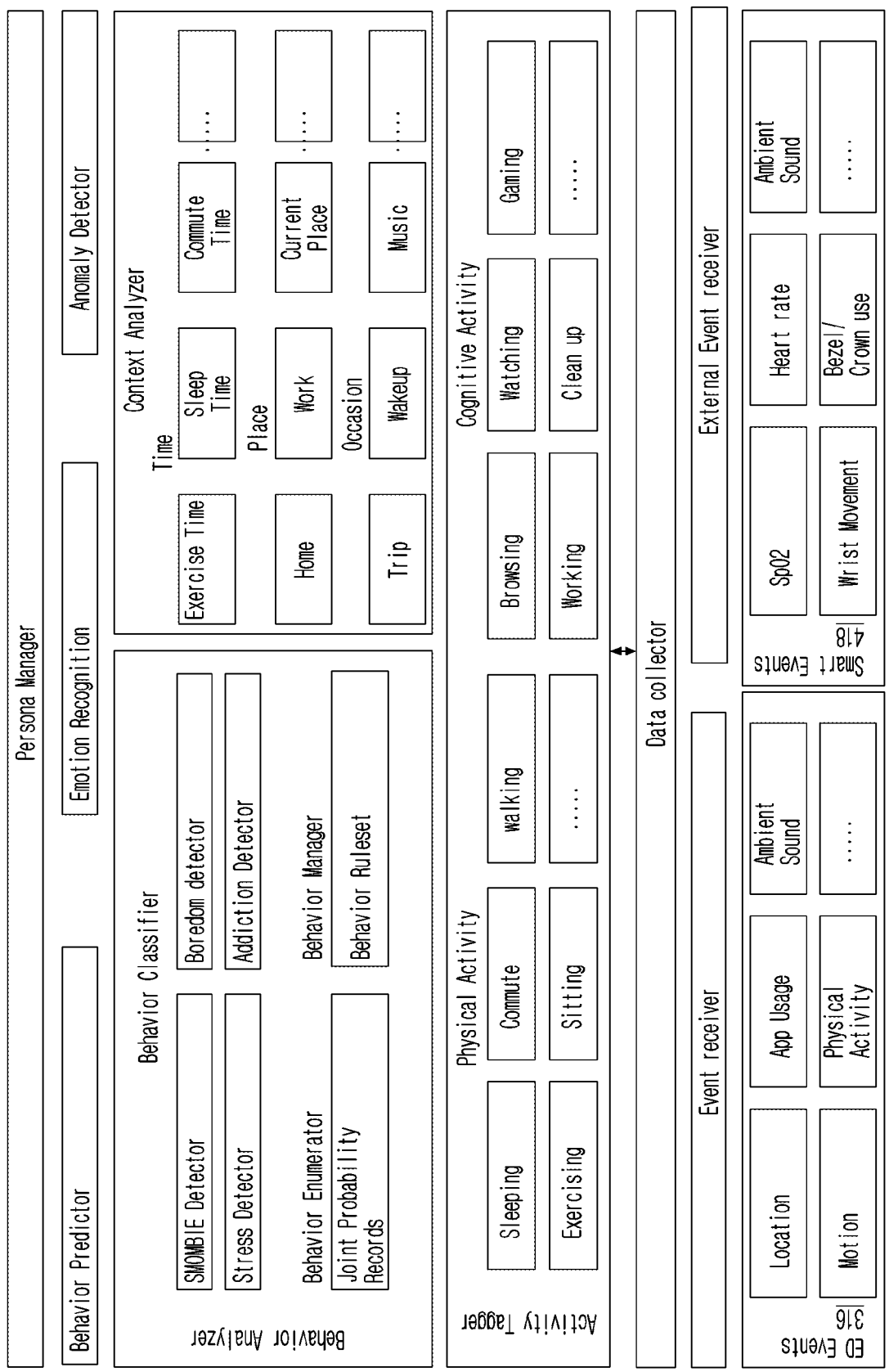
FIG. 4 is a diagram illustrating an example configuration of a behaviour detection engine, according to various embodiments.

FIG. 4 is a diagram illustrating an example behaviour engine 260, according to embodiments as disclosed herein. The behaviour engine 260 has a layered architecture. A log collector collects device usage data such as ambient sound, location, motion, application usage, physical activity, and so on. The activity analyzer generates pattern and preferences of user based on logs. The activity monitor provides current context of the user, such as user is sleeping at home listening to music (time/place/occasion). The context manager and the persona manager are interfaces for delivering information generated from the activity analyzer and the activity monitor.

Embodiments herein disclose that the behaviour engine 260 monitors events, activities, context in association with activities to detect the behavior of the user. The events are the automatic signals received from device sensors such as a step count, walking start, walking stop, mic, accelerometer, gyroscope, heart rate, touch, oxygen saturation (SpO2), magnetometer, Global Positioning System (GPS), network, Near Field Communication (NFC), Wi-Fi, Bluetooth, Radio, Universal serial bus (USB), wireless local-area network (WLAN), proximity, barometer, compass, Magnetic Secure Transmission (MST) and the like. The events can also be received from other smart devices for example watch, tv, smart refrigerator, tablet, IOT devices, and the like. The smart devices (130A-130N) and device sensors can send data to the electronic devices (120A-120N). The electronic devices (120A-120N) control the smart devices and the device sensors. The activity can be tagged from set of events belonging to a task. Examples of the task may include, but not limited to, sensory events identified from user activity such as sleeping, walking, standing, sitting, cooking, and the like. Examples of the task may include, but not limited to, data usage events such as browsing, watching (phone or television), gaming, shopping, no purpose (keeping the screen on by constant touch without using any applications and opening and closing smart refrigerator without taking out anything) and the like. Examples of the context can be, but not limited to, time, place, occasion and the environment of the user. The place can be a semantic tag of the location co-ordinates of the user; for example, home, workplace, shop, mall, park, zoo, airport, near home, near parent's home and the like. The occasion will describe the moment of the user; for example, wake up, about to sleep, commute, parking car, driving, on a trip and the like. The environment can be inferred from captured media, ambient audio, received messages (like transactions), location coordinates, and so on. The behavior can be defined as co-occurrences of activities; for example, walking while browsing, watching short videos while lying down, walking while watching videos in a traffic environment, and the like.

Figure 5:
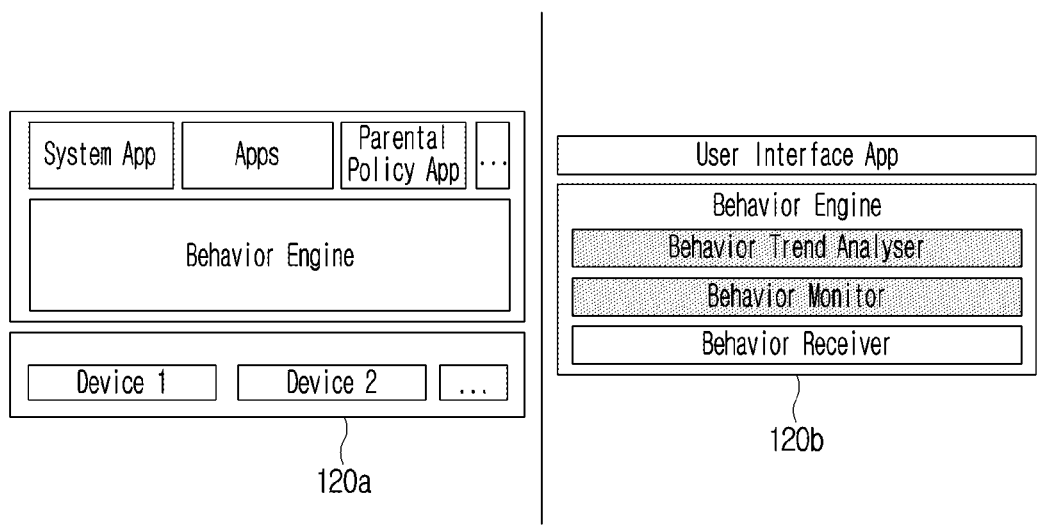
FIG. 5 is a diagram illustrating an example of behaviour detection in a child's electronic device and altering a parent's electronic device based on the detected behavior of the child, according to various embodiments.

FIG. 5 is a diagram illustrating an example of behaviour detection in a child's electronic device and altering a parent's electronic device based on the detected behavior of the child, according to various embodiments. A classifier based on heuristics from the behavior engine 260 of the child's electronic device 120a includes a state management engine. The state management engine detects the child's current state. Data will be monitored for change(s) in the child's state in the state management to detect behavioral changes.

The behavioral changes of the child can be then informed to the parent through the parent's electronic device 120*b*.

FIG. 6 is a diagram illustrating an example of Joint Probability Distribution (JPD) tables, according to various embodiments. The JPD table shows example physical and cognitive activities performed by a plurality of users in one or more contexts. Each table represents joint probabilities of all the activities in a context. Each cell includes a probability of activity combinations with respect to all possible user's activities. The probability of activity combination of the physical activity and one or more cognitive activities can be calculated. The JPD tables include a global ruleset for probabilities of defined behaviors. The global ruleset is defined at the server which is downloaded on to a device. The ruleset is either preconfigured or is dynamically updated by a human based on the emotion correlation for reported behaviors at the server. When the probability of the defined behavior crosses a threshold, then the behavior is considered for anomalous or new behaviour based on number of users exhibiting the same behavior. For deriving a new behavior, a multivariate joint probability distribution PDF $f(x_1, \ldots, x_n)$ for each activity xi can be defined to characterize the probability of a joint event, where each of the n activities variables falls in a specific range as given in the below equation $$P(a_1 \leq X_1 \leq b_1, \ldots, a_n \leq X_n \leq b_n) = \int_{a_n}^{b_n} \ldots \int_{a_1}^{b_1} f(x_1, \ldots x_n) dx_1 \ldots dx_n$$

FIG. 7 is a diagram illustrating an example emotion correlation with the behavior, according to various embodiments. For each context, the JPD of activities are calculated. The each JPD activity combination includes an emotion score. The emotion score is different types of emotions (including and not limited to happy, sad, angry, and the like). The emotion score is analyzed by a machine learning model. The machine learning model may be trained to identify emotions based on user data. The user data can include and not limiting to facial expressions, voice, user response, and the like. The emotion of the user can be captured during each behaviour as a probability distribution across emotion spectrum. Each behaviour can be correlated with particular emotion to understand an impact of behaviour. The emotion helps in curating sought and unsought behaviors.

Figure 8:
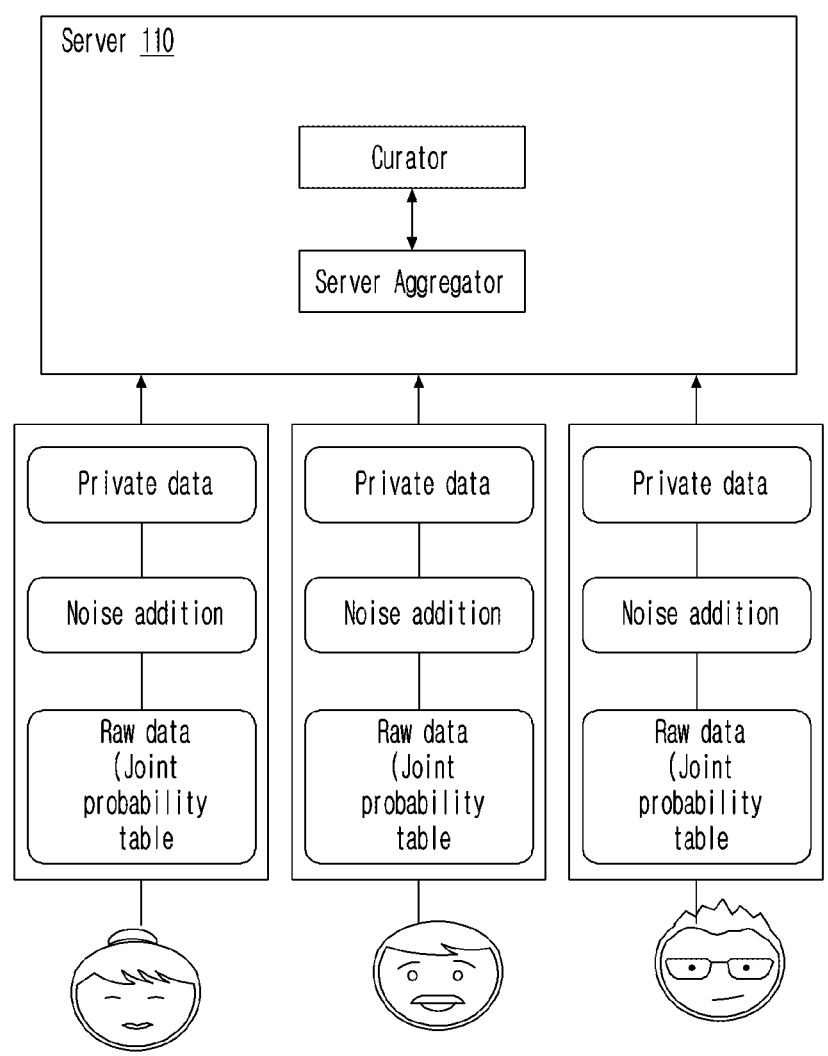
FIG. 8 is a diagram illustrating an example JPD table for each context with emotion communicated to a server after applying differential privacy, according to various embodiments.

FIG. 8 is a diagram illustrating an example JPD table for each context with emotion communicated to a server after applying differential privacy, according to various embodiments. ε-DP is applied to JPD tables and the ε-DP JPD tables are shared with the server 110 for aggregation. Differential Privacy levels ensures the JPD tables shared with the server 110 remain private. The application of differential privacy may refer, for example, to adding noise to a raw data (JPD) to make the JPD private.

Figure 9:
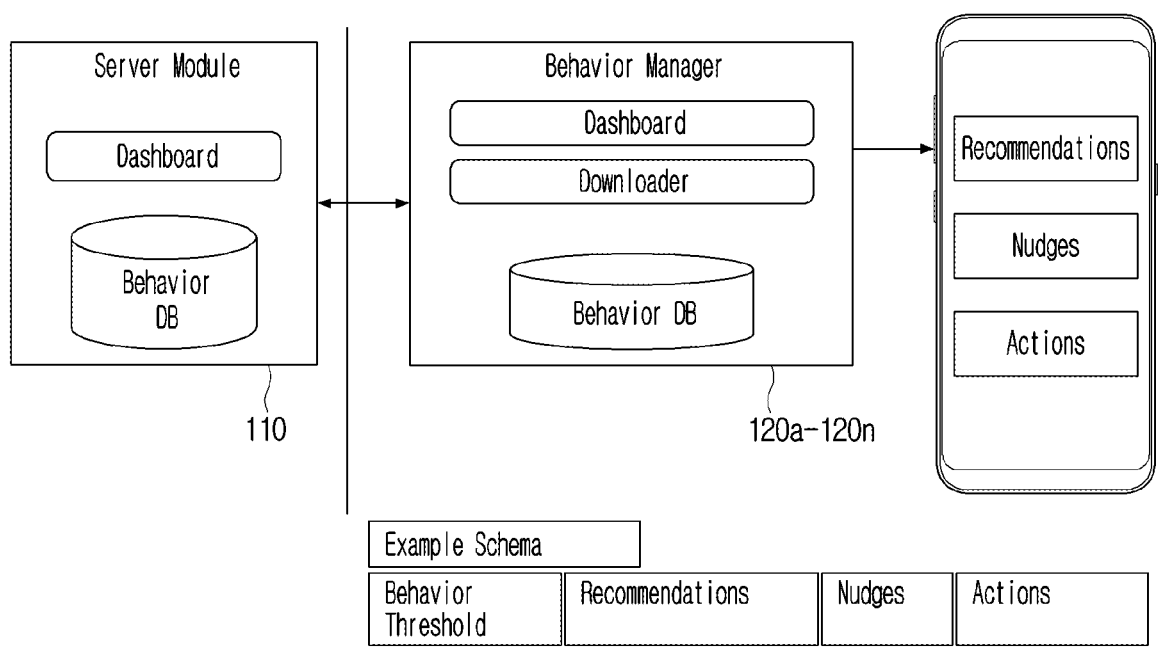
FIG. 9 is a diagram illustrating an example ruleset available on the electronic device or the server, according to various embodiments.

FIG. 9 is a diagram illustrating an example ruleset available on the electronic device or the server, according to various embodiments. The server includes a database and the database includes rulesets The rulesets define a behavior, which will have thresholds, actions/recommendations/nudges for each behavior. That ruleset is downloaded on each device and used to trigger the corresponding action/recommendation/nudge according to behavior.

Figure 10:
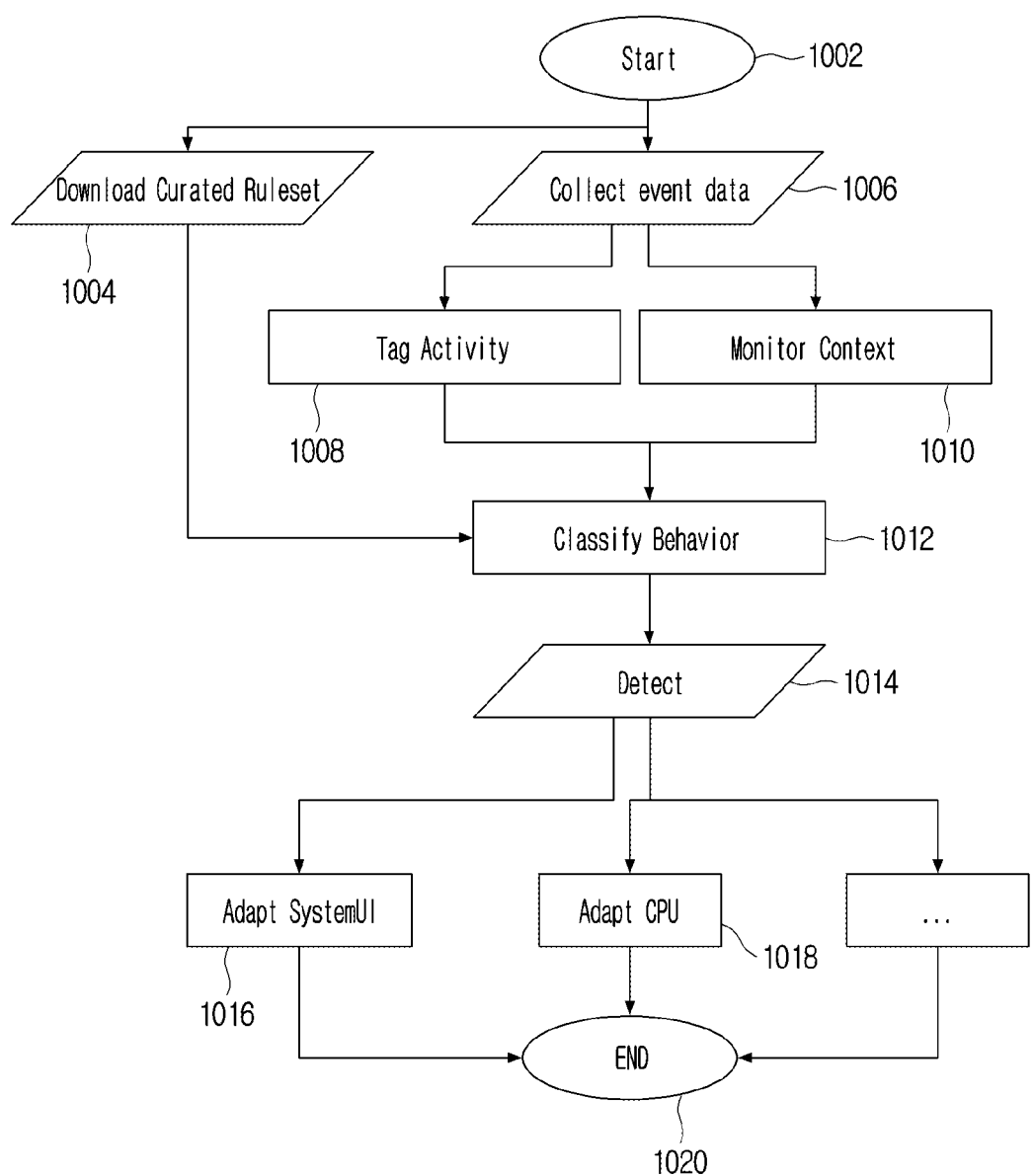
FIG. 10 is a flowchart illustrating an example method of behavior detection from a physical and cognitive activity of the user, according to various embodiments.

FIG. 10 is a flowchart illustrating an example method of behavior detection from a physical and cognitive activity of the user, according to various embodiments. At 1002, the method includes starting, by the electronic device 120*a*, the behavior detection from a physical and cognitive activity of the user. At 1004, the method includes downloading, by the electronic device 120*a*, a curated ruleset. At 1006, the method includes collecting, by the electronic device 120*a*, event data. At 1008, the method includes tagging, by the electronic device 120*a*, an activity. At 1010, the method includes monitoring, by the electronic device 120*a*, the context of the activity. At 1012, the method includes, classifying, by the electronic device 120*a*, behavior. At 1014, the method includes, detecting, by the electronic device 120*a*, the behavior of the user. At 1016, the method includes, adapting, by the electronic device 120*a*, system user interface. At 1018, the method includes adapting, by the electronic device 120*a*, the CPU. At 1020, the method includes ending, by the electronic device 120*a*, the behavior detection from a physical and cognitive activity of the user.

The embodiments disclosed herein can be implemented through at least one software program running on at least one hardware device and performing network management functions to control the elements. The elements can be at least one of a hardware device, or a combination of hardware device and software module.

Figure 11:
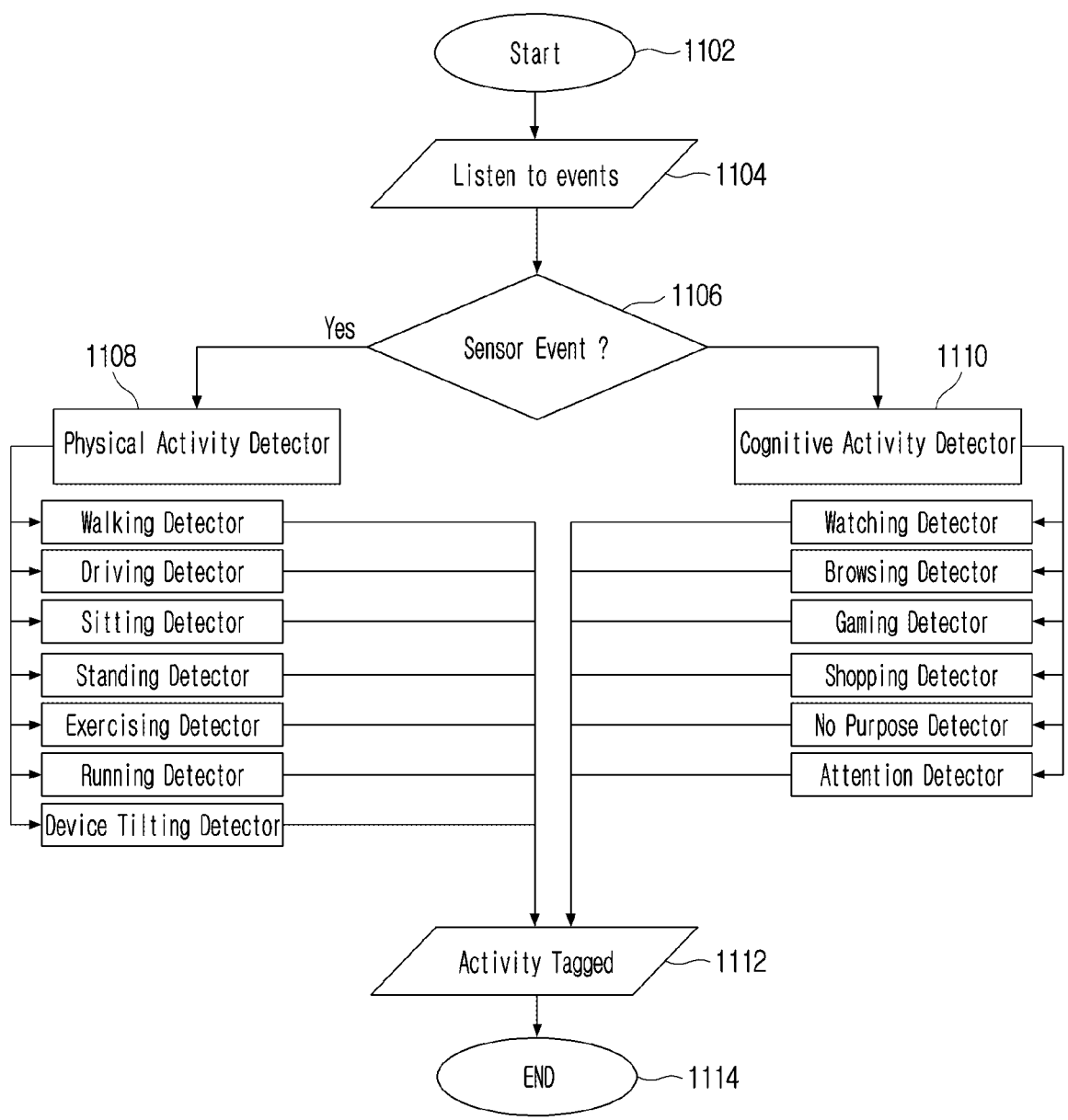
FIG. 11 is a flowchart illustrating an example method of activity tagger of the detected behavior of the users, according to various embodiments.

FIG. 11 is a flowchart illustrating an example method of activity tagger of the detected behavior of the users, according to various embodiments. At 1102, the method includes starting, by the electronic device 120*a*, activity tagging. At 1104, the method includes listening, by the electronic device 120*a*, the events. At 1106, the method includes checking, by the electronic device 120*a*, if the listened event is a sensor event. If the listened event is the sensor event, in 1108, the method includes detecting, by the electronic device 120*a*, which physical activity was performed by the user, in 1110, the method includes detecting which cognitive activity was performed by the user. At 1112, the method includes tagging, by the electronic device 120*a*, an appropriate activity for the listened event. At 1114, the method includes ending, by the electronic device 120*a*, the activity tagging of the user.

The embodiments disclosed herein can be implemented through at least one software program running on at least one hardware device and performing network management functions to control the elements. The elements can be at least one of a hardware device, or a combination of hardware device and software module.

Figure 12:
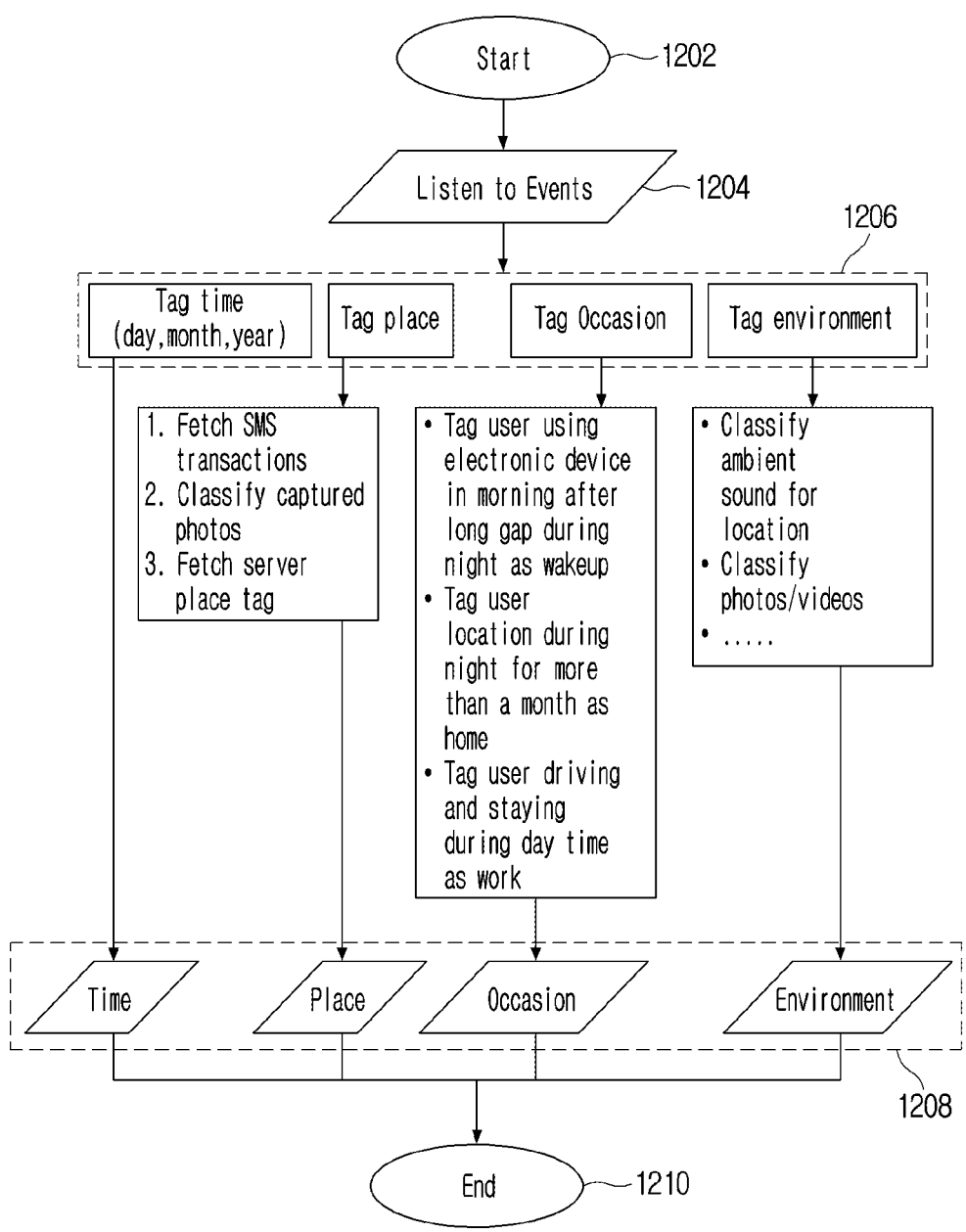
FIG. 12 is a flowchart illustrating an example method of context analyzer of the detected behavior of the users, according to various embodiments.

FIG. 12 is a flowchart illustrating an example method of context analyzer of the detected behavior of the users, according to various embodiments. At 1202, the method includes starting, by the electronic device 120*a*, context analysis. At 1204, the method includes listening, by the electronic device 120*a*, for one or more events. At 1206, the method includes tagging, by the electronic device 120*a*, the events into a type of context. At 1208, the method includes categorizing, by the electronic device 120*a*, the events into a type of context. At 1210, the method includes ending, by the electronic device 120*a*, context analyzing.

The embodiments disclosed herein can be implemented through at least one software program running on at least one hardware device and performing network management functions to control the elements. The elements can be at least one of a hardware device, or a combination of hardware device and software module.

Figure 13:
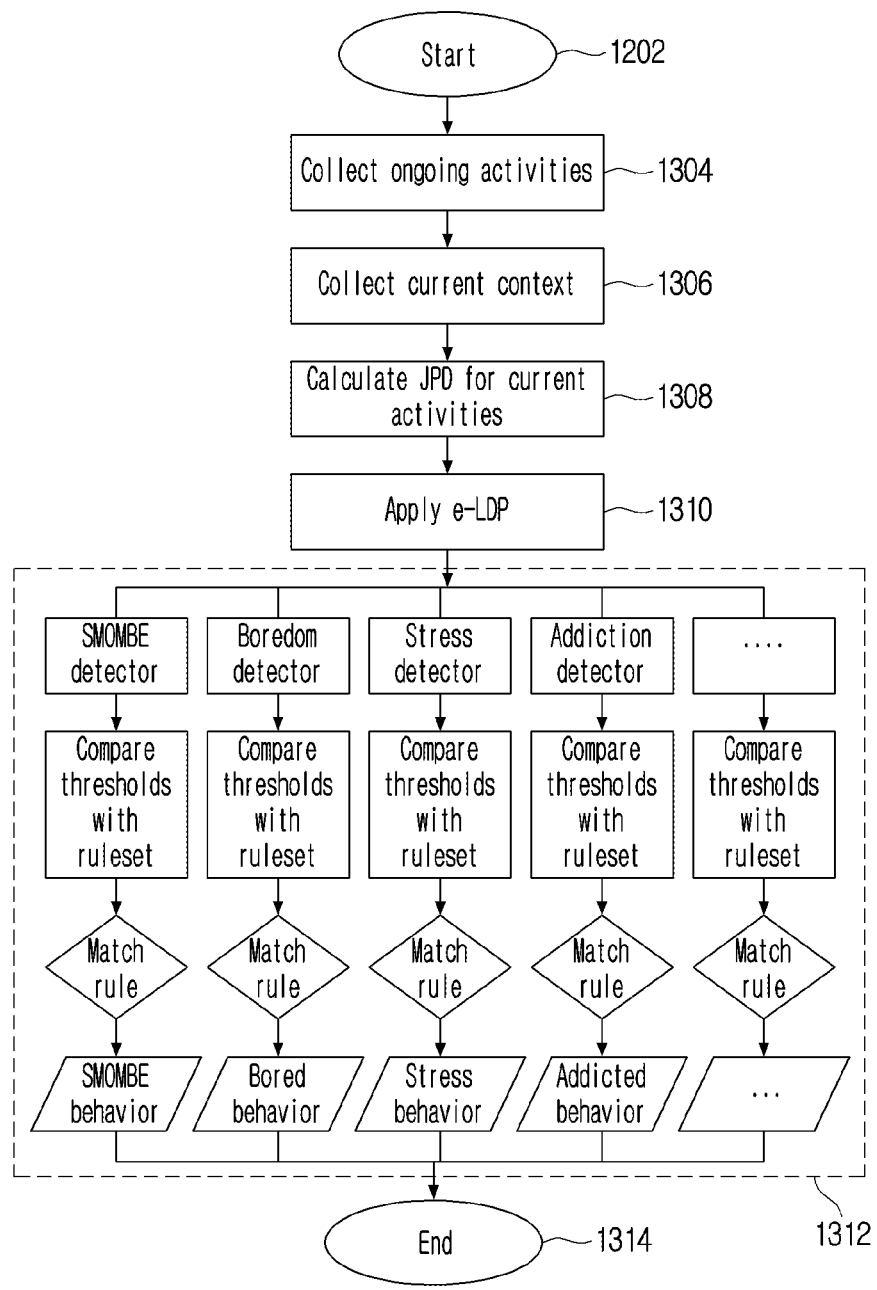
FIG. 13 is a flowchart illustrating an example method of behavior classifier of the detected behavior of the users, according to various embodiments.

FIG. 13 is a flowchart illustrating an example method of behavior classifier of the detected behavior of the users, according to various embodiments. At 1302, the method includes starting, by the electronic device 120*a*, behavior classifier. At 1304, the method includes collecting, by the electronic device 120*a*, ongoing activities of the user. At 1306, the method includes collecting, by the electronic device 120*a*, concurrent context of the ongoing activities. At 1308, the method includes calculating, by the electronic device 120*a*, the JPD for current activities. At 1310, the method includes applying, by the electronic device 120*a*, *e*-Label Distribution Protocol (LDP). At 1314, the method includes ending, by the electronic device 120*a*, behavior classifier of the user.

The embodiments disclosed herein can be implemented through at least one software program running on at least one hardware device and performing network management functions to control the elements. The elements can be at least one of a hardware device, or a combination of hardware device and software module.

Figure 14:
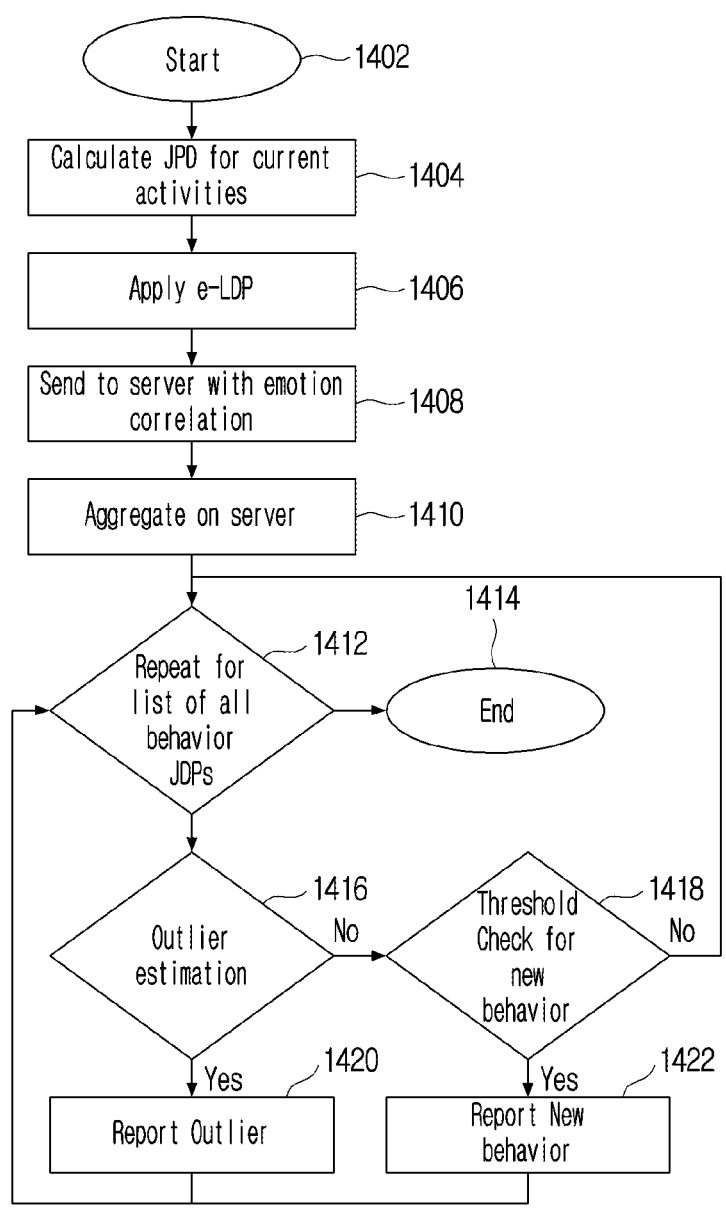
FIG. 14 is a flowchart illustrating an example method of new behavior detection of the detected behavior of the users, according to various embodiments.

FIG. 14 is a flowchart illustrating an example method of new behavior detection of the detected behavior of the users, according to various embodiments. At 1402, the method includes starting, by the electronic device 120*a*, new behavior detection. At 1404, the method includes calculating, by the electronic device 120*a*, the JPD for current activities. At 1406, the method includes applying, by the electronic device 120*a*, *e*-LDP. At 1408, the method includes sending, by the electronic device 120*a*, the emotional correlation the server 110. At 1410, the method includes providing (e.g. aggregating), by the electronic device 120*a*, a list of all behavior JPDs. At step, the method includes checking, by the electronic device 120*a*, if a list of all behavior JPDs is repeated. At 1414, the method includes ending, by the electronic device 120*a*, the new behavior detection if the list of all behavior JPDs is not repeated. At 1416, the method includes estimation, by the electronic device 120*a*, the repeated list of all behavior JPDs. At 1418, the method includes checking, by the electronic device 120*a*, if the threshold for new behavior exceeds a predefined value. At 1420, the method includes reporting, by the electronic device 120*a*, the outlier, if the threshold is within the predefined value. At 1422, the method includes reporting, by the electronic device 120*a*, the new behavior detection, if the threshold exceeds the predefined value.

The embodiments disclosed herein can be implemented through at least one software program running on at least one hardware device and performing network management functions to control the elements. The elements can be at least one of a hardware device, or a combination of hardware device and software module.

Figure 15:
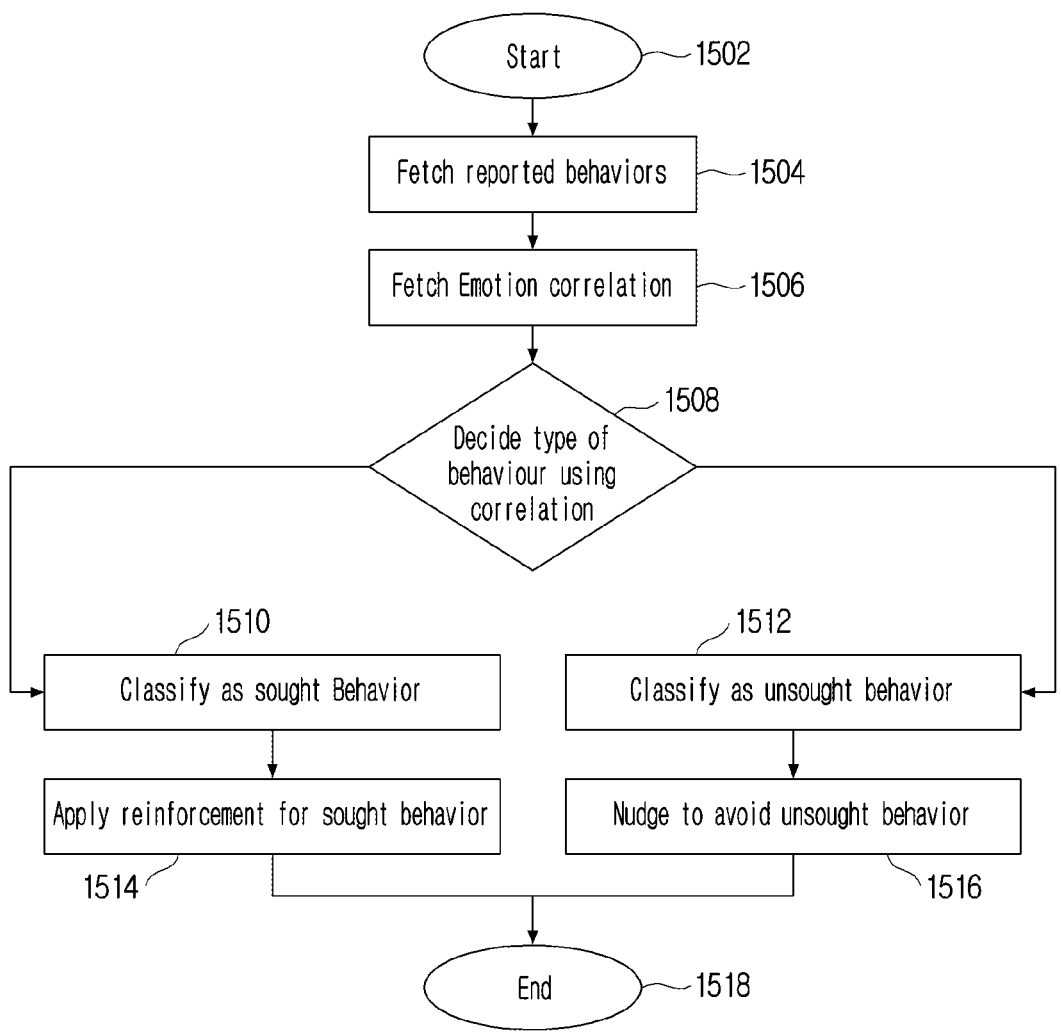
FIG. 15 is a flowchart illustrating an example method of behavior curation of the detected behavior of the users, according to various embodiments.

FIG. 15 is a flowchart illustrating an example method of behavior curation of the detected behavior of the users, according to various embodiments. At 1502, the method includes starting, by the electronic device 120*a*, behavior curation. At 1504, the method includes fetching, by the electronic device 120*a*, reported behaviors. At 1506, the method includes fetching, by the electronic device 120*a*, emotion correlation. At 1508, the method includes checking, by the electronic device 120*a*, a type of behaviors. At 1510, the method includes classifying, by the electronic device 120*a*, the emotion as a sought behavior. At 1512, the method includes classifying, by the electronic device 120*a*, the emotion as an unsought behavior. At 1514, the method includes applying, by the electronic device 120*a*, reinforcement for the sought behavior. At 1516, the method includes nudging, by the electronic device 120*a*, to avoid the unsought behavior. At 1518, the method includes ending, by the electronic device 120*a*, behavior curation.

The embodiments disclosed herein can be implemented through at least one software program running on at least one hardware device and performing network management functions to control the elements. The elements can be at least one of a hardware device, or a combination of hardware device and software module.

Figure 16:
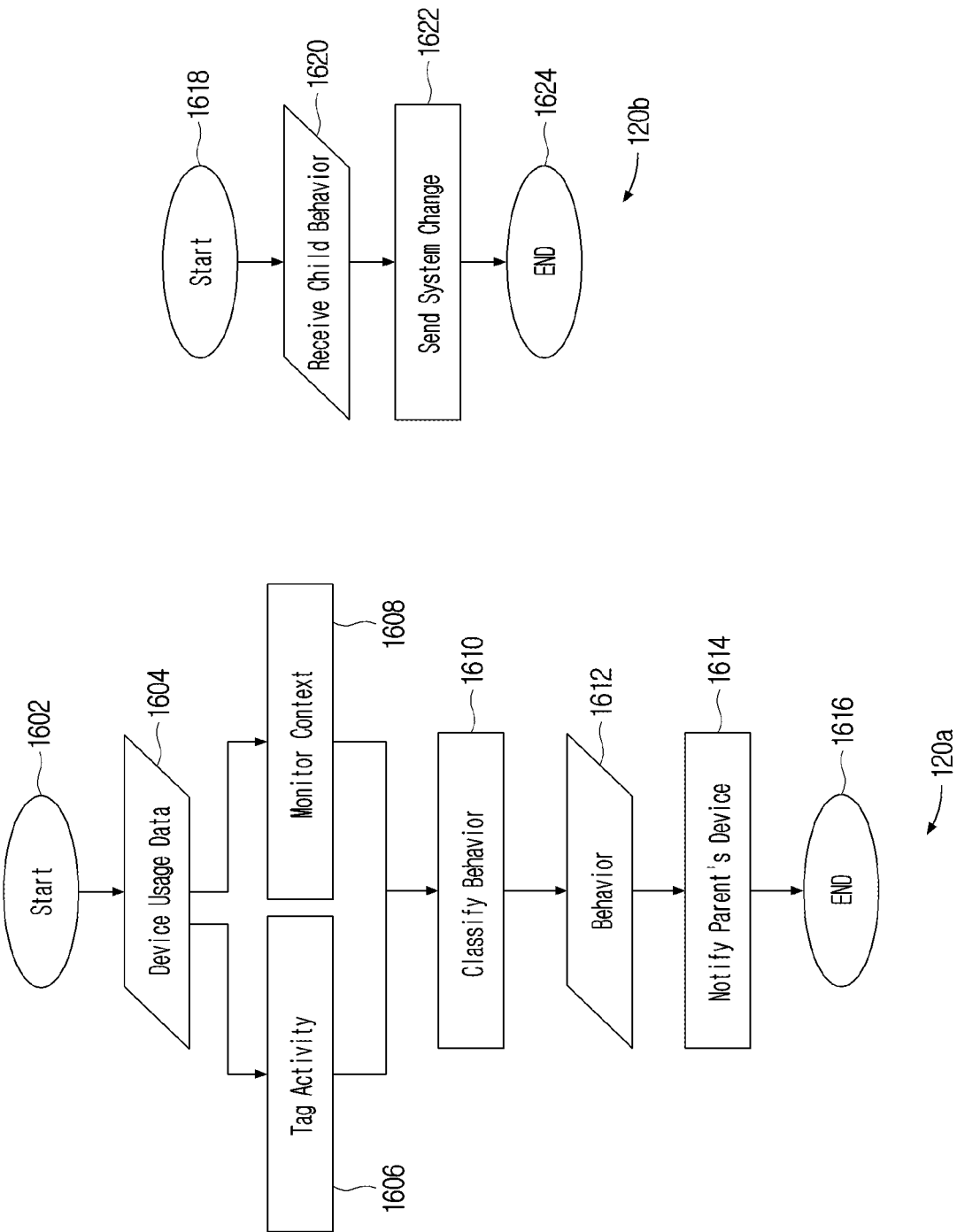
FIG. 16 is a flowchart illustrating an example method of parental control on a child's electronic device, according to various embodiments.

FIG. 16 includes flowcharts illustrating an example method of parental control on a child's electronic device, according to various embodiments. At 1602, the method includes starting, by the child's electronic device 120*b*, parental control on a child's electronic device 120*a*. At 1604, the method includes monitoring and outputting, by the child's electronic device 120*a*, usage of data by child. At 1606, the method includes tagging, by the child's electronic device 120*a*, activity. At 1608, the method includes monitoring, by the child's electronic device 120*a*, context. At 1610 and 1612, the method includes classifying, by the child's electronic device 120*a*, the child's behavior. At 1614, the method includes notifying, by the child's electronic device 120*a*, the behavior of the child to the parent's electronic device 120*b*. At 1616, the method includes ending, by the child's electronic device 120*a*, parental control on a child's electronic device 120*a*. At 1618, the method includes starting, by the parent's electronic device 120*b*, parental control on a child's electronic device 120*a*. At 1620, the method includes receiving, by the parent electronic device 120*b*, the child's behavior. At 1622, the method includes sending, by the parent electronic device 100*b*, the system changes to the child's electronic device 120*a*. At 1624, the method includes ending, by the parent's electronic device 120*b*, parental control on a child's electronic device 120*a*.

The embodiments disclosed herein can be implemented through at least one software program running on at least one hardware device and performing network management functions to control the elements. The elements can be at least one of a hardware device, or a combination of hardware device and software module.

Figure 17:
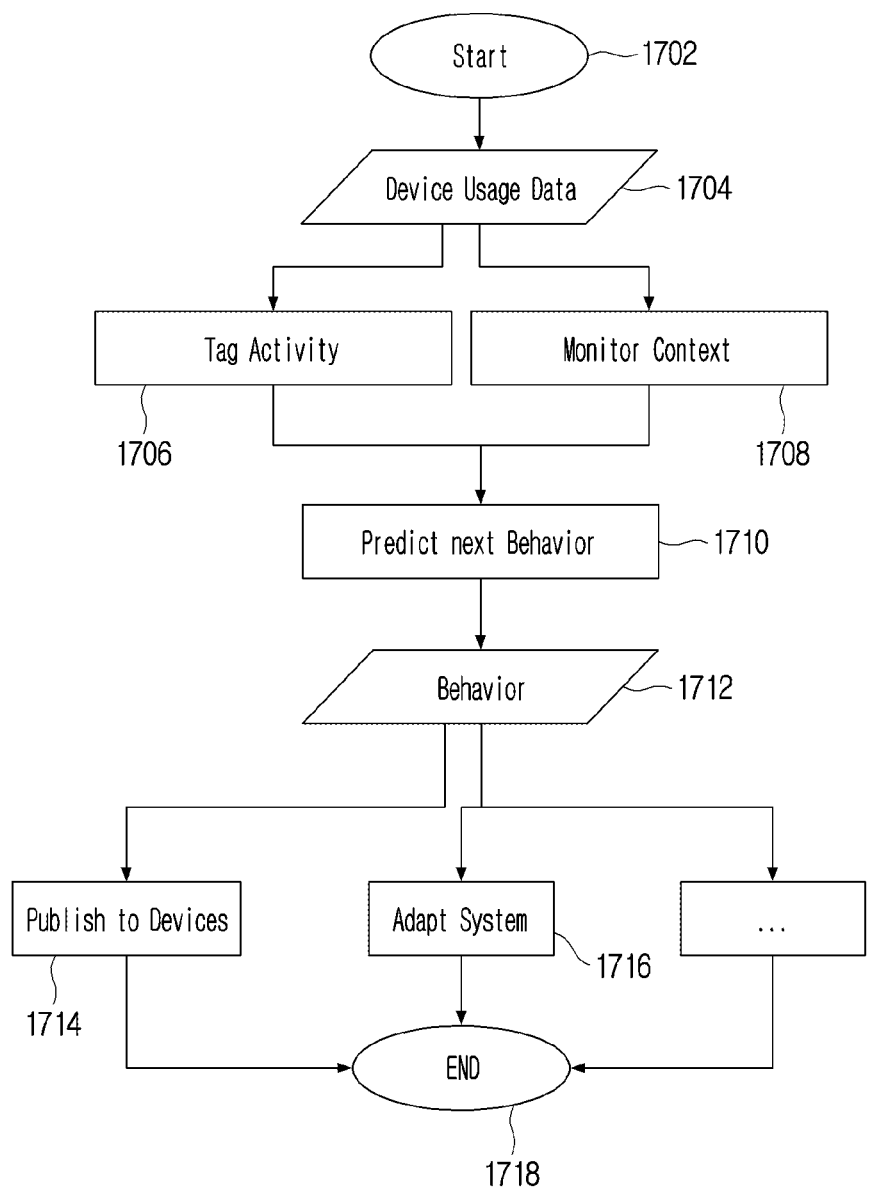
FIG. 17 is a flowchart illustrating an example method of next behavior prediction of the detected behavior of the users, according to various embodiments.

FIG. 17 is a flowchart illustrating an example method of next behavior prediction of the detected behavior of the users, according to various embodiments. At 1702, the method includes starting, by the electronic device 120*a*, next behavior prediction. At 1704, the method includes monitoring, by the electronic device 120*a*, the device data usage. At 1706, the method includes tagging, by the electronic device 120*a*, the activity. At 1708, the method includes monitoring, by the electronic device 120*a*, the context of the activity. At 1710 and 1712, the method includes predicting, by the electronic device 120*a*, next behavior. At 1714, the method includes publishing, by the electronic device 120*a*, next behavior on the electronic devices. At 1716 the method includes adapting, by the electronic device 120*a*, next behavior. At 1718, the method includes ending, by the electronic device 120*a*, next behavior prediction.

The embodiments disclosed herein can be implemented through at least one software program running on at least one hardware device and performing network management functions to control the elements. The elements can be at least one of a hardware device, or a combination of hardware device and software module.

Figure 18:
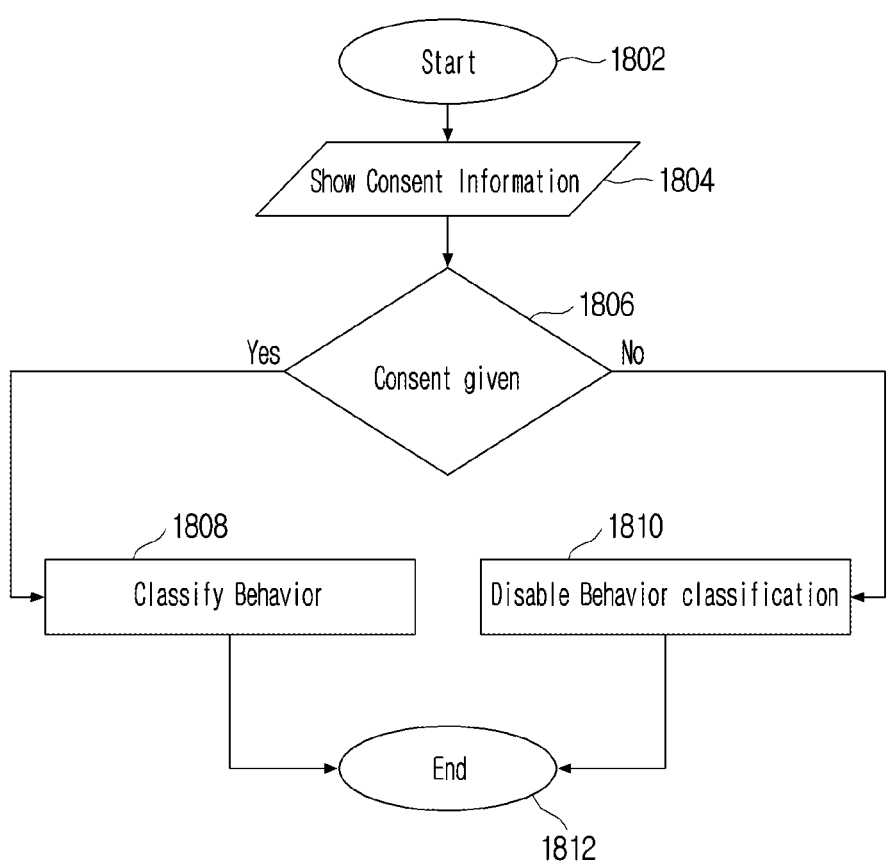
FIG. 18 is a flowchart illustrating an example method of user control for Opt-in, according to various embodiments.

FIG. 18 is a flowchart illustrating an example method of user control for Opt-in, according to various embodiments. At 1802, the method includes starting, by the electronic device 120*a*, user control for Opt-in. At 1804, the method includes showing, by the electronic device 120*a*, a consent information. At 1806, the method includes checking, by the electronic device 120*a*, if the consent was given by the user. At 1808, the method includes classifying, by the electronic device 120*a*, the behavior if the consent was given by the user. At 1810, the method includes disabling, by the electronic device 120a, behavior classification if the consent was not given by the user. At 1812, the method includes ending, by the electronic device 120a, user control for Opt-in.

The embodiments disclosed herein can be implemented through at least one software program running on at least one hardware device and performing network management functions to control the elements. The elements can be at least one of a hardware device, or a combination of hardware device and software module.

Figure 19:
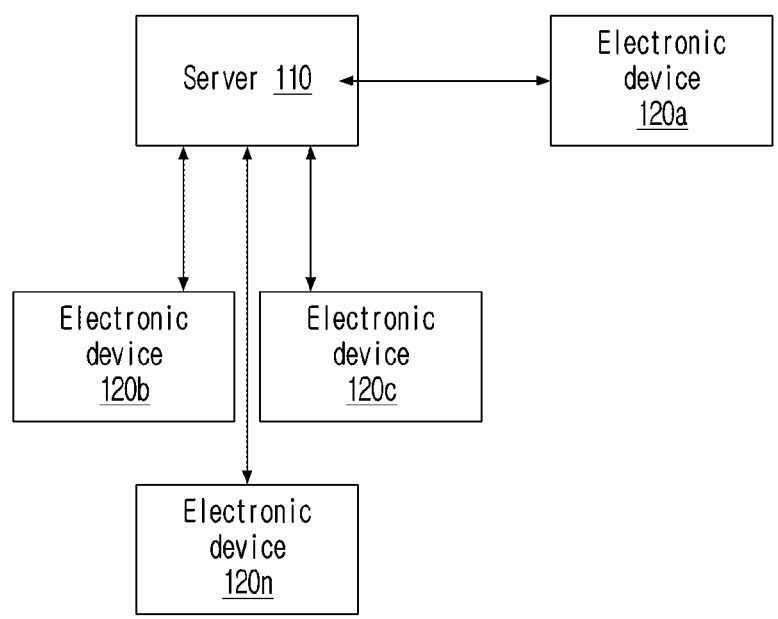
FIG. 19 is a diagram illustrating an example process of Federated Learning (FL), according to various embodiments.

FIG. 19 is a diagram illustrating an example process of Federated Learning (FL), according to various embodiments. In the federated learning setup, all devices for example the electronic devices (120A-120N) and the smart devices (130A-130N) report the trained model to the server 110 for aggregation, wherein the aggregated global model is shared back to all devices for identifying new behaviours. A behavior classification model is downloaded from the server to selected mobile devices, wherein the model is trained using the user's personal data on the device. Weight-updates, after training locally, are communicated to the server. Aggregators average out the leanings from various devices and update the final model in server side.

Figure 20:
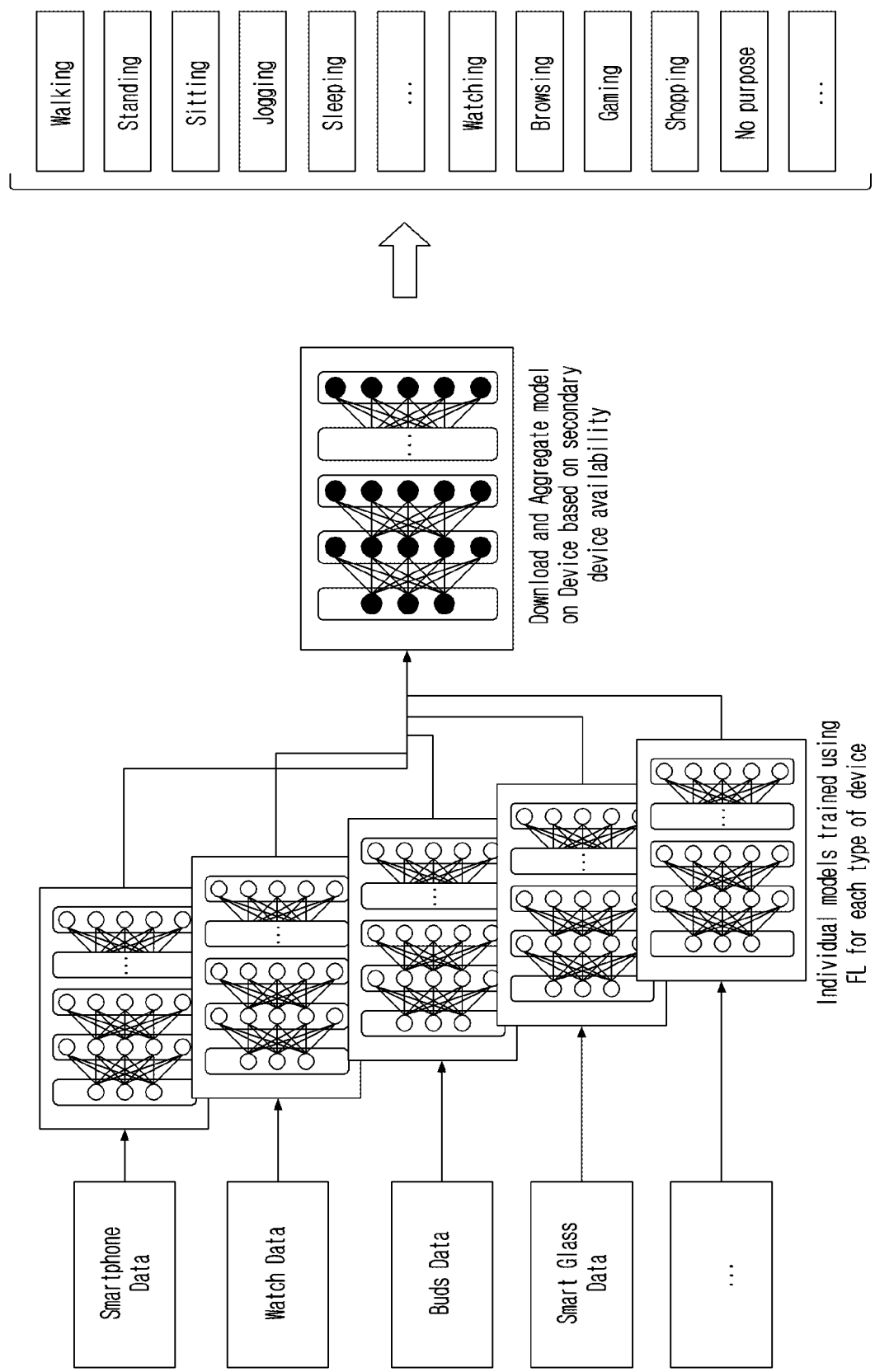
FIG. 20 is a diagram illustrating an example method of activity detector using the FL, according to various embodiments.

FIG. 20 is a diagram illustrating an example method of activity detector using the FL, according to various embodiments. Individual models are trained using FL for each type of electronic devices. Also, the aggregation model is available for secondary devices. As all users might not have the same set of devices, the model is trained on each device of the user and sent to server 110 for aggregation. For prediction/inference, the models are downloaded according to availability of the devices with the user. Aggregated and used for inference.

FIG. 21 is a flowchart illustrating an example method 2100 to identify behavioral trends across users, according to various embodiments. At 2102, the method 2100 includes detecting, by a first electronic device 102a, a first plurality of physical activities performed by a first user in relation with a plurality of contexts. At 2104, the method 2100 includes recognizing, by the first electronic device 120a, the first plurality of physical activities in relation with the plurality of contexts for the first user. At 2106, the method 2100 includes recognizing, by the first electronic device or first smart devices 130a, multiple activities performed using electronic devices by the first user during each first physical activity in each context. At 2108, the method 2000 includes recognizing, by a second electronic device 120b, a second plurality of physical activities performed by multiple concurrent second users during each context. At 2110, the method 2100 includes recognizing, by the second electronic device 120b or a second smart device 130b, multiple activities performed using the second smart devices by the multiple concurrent second users during each second physical activity in each context. At 2112, the method 2100 includes drawing, by a server 110, a correlation between the first user and multiple concurrent second users, the first plurality of physical activities, the second plurality of physical activities, and the multiple activities performed on first smart devices 130a and second smart device 130b during each context. At 2114, the method 2100 includes referring, by the server 110, a correlation to generate at least one behavioral trend information indicative of a current behaviour or a new behavior of the plurality of the users.

The embodiments disclosed herein can be implemented through at least one software program running on at least one hardware device and performing network management functions to control the elements. The elements can be at least one of a hardware device, or a combination of hardware device and software module.

Embodiments herein disclose an example, where behavior context generated can be used by applications to alter their behavior. When the user is a zombie (using the device while walking), then delays low-priority notifications or reduce animations etc., so that the user can stop using the device soon for his safety. Another example use case, consider that the user is bored, then the time can be used for creative purposes or cleaning up pending items. The behavior detection engine classifies the current context as bored, and apps such as reminder, notes can notify the user about pending items. Storage apps can ask the user to clean up space, health apps can remind about health goals etc. Yet another example use case, consider that the user is playing games under an addictive behaviour (gambling, longer play time, and so on), then digital well-being apps can nudge the user to reduce playing time. The behavior detection engine classifies current context as gaming addiction, and apps such as digital wellbeing, health can notify the user about taking a break. Payment apps can notify money spent on gambling, etc.

Additional example use cases are digital wellbeing can nudge (e.g., urge) the user to avoid using phone while walking, digital wellbeing can nudge the user to connect with friends/family, self-reflect, meditate etc., nudge the user to use the time productively by acting on pending tasks from to-do lists or doing something creative, finding opportune moments for content recommendation like apps, games, articles, videos etc., delay promotions and low priority notifications to show when user is bored, to have better hit rate, monetization purposes, and so on.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for identifying behavioural trends across users, the method comprising:
   detecting, by a first electronic device, a first plurality of physical activities performed by a first user in relation with a plurality of contexts;
   recognizing, by the first electronic device, the first plurality of physical activities in relation with the plurality of contexts for the first user;
   recognizing, by the first electronic device and/or first smart devices, multiple activities performed using the first smart devices by the first user during each first physical activity in each context;
   recognizing, by a second electronic device, a second plurality of physical activities performed by multiple concurrent second users during each context;
   recognizing, by the second electronic device and/or second smart devices, multiple activities performed using the second smart devices by the multiple concurrent second users during each second physical activity in each context;
   drawing, by a server, a correlation between the first user and multiple concurrent second users, the first plurality of physical activities, the second plurality of physical activities, and the multiple activities performed on the first smart devices and the second smart devices during each context; and referring, by the server, the correlation to generate at least one behavioural trend information indicative of a current behaviour or a new behaviour of the plurality of the users.

2. The method as claimed in claim 1, wherein the plurality of contexts comprises at least one of time, place, occasion, and environment.

3. The method as claimed in claim 1, wherein the activities of the plurality of users are correlated using at least one joint probability distribution (JPD) table for each context.

4. The method as claimed in claim 1, wherein the method further comprises: predicting, by the first electronic device, a next behavior of the user using a Machine Learning (ML) model based on at least one of current behavior, the context and current activities of the user.

5. The method as claimed in claim 1, wherein the method further comprises: curating, by the first electronic device, the new behavior as a sought behaviour and an unsought behavior, wherein the at least one provided behavioural recommendation can reinforce the sought behaviors and diminish the unsought behaviors.

6. The method as claimed in claim 1, wherein the method further comprises: sending, by the user devices, a joint probability distribution (JPD) tables to a server for aggregation of the JPD tables of different users.

7. The method as claimed in claim 1, wherein the method further comprises: capturing, by the first electronic device, emotion information of the users to curate the one or more identified behaviors as sought and unsought behaviors.

8. The method as claimed in claim 1, wherein the method further comprises: providing, by the first electronic device, recommendations to reinforce the sought behaviors.

9. The method as claimed in claim 1, wherein the method further comprises: providing, by the first electronic device, recommendations to diminish the unsought behaviors.

10. The method as claimed in claim 1, wherein the method further comprises: identifying, by the server, outlier and anomalous behaviors which have probabilities different from global averages.

11. The method as claimed in claim 1, wherein the electronic devices are trained in a distributed manner to recognize the activities.

12. The method as claimed in claim 1, wherein a joint probability distribution (JPD) tables are shared with the server while maintaining privacy of the JPD tables.

13. The method as claimed in claim 1, wherein the method further comprises: curating, by a human curator, to define sought or unsought behaviors and to define actions or recommendations or urging for each behaviour of the users.

14. The method as claimed in claim 1, wherein the method further comprises: identifying by the server, an outlier and anomalous user behaviors having probabilities of different behaviors from global behavioural averages.

15. A system configured to identify behavioural trends across users, comprising:
a server;
a plurality of electronic devices; and
a plurality of smart devices comprising first smart devices and second smart devices;
wherein the plurality of electronic devices comprises,
a memory;
at least one processor;
a behavioural recommendation controller, comprising circuitry, connected to the memory and the at least one processor, the behavioural recommendation controller configured to:
  detect a first plurality of physical activities performed by a first user in relation with a plurality of contexts;
  recognize the first plurality of physical activities in relation with the plurality of contexts for the first user;
  recognize multiple activities performed using the first smart devices by the first user during each first physical activity in each context;
  recognize a second plurality of physical activities performed by multiple concurrent second users during each context; and
  recognize multiple activities performed using the second smart devices by the multiple concurrent second users during each second physical activity in each context;
wherein the server is configured to:
  draw a correlation between the first user and multiple concurrent second users, the first plurality of physical activities, the second plurality of physical activities, and the multiple activities performed on the first smart devices and the second smart devices during each context; and
  refer a correlation to generate at least one behavioural trend information indicative of a current behaviour or a new behaviour of the plurality of the users.

* * * * *